Patented Apr. 22, 1930

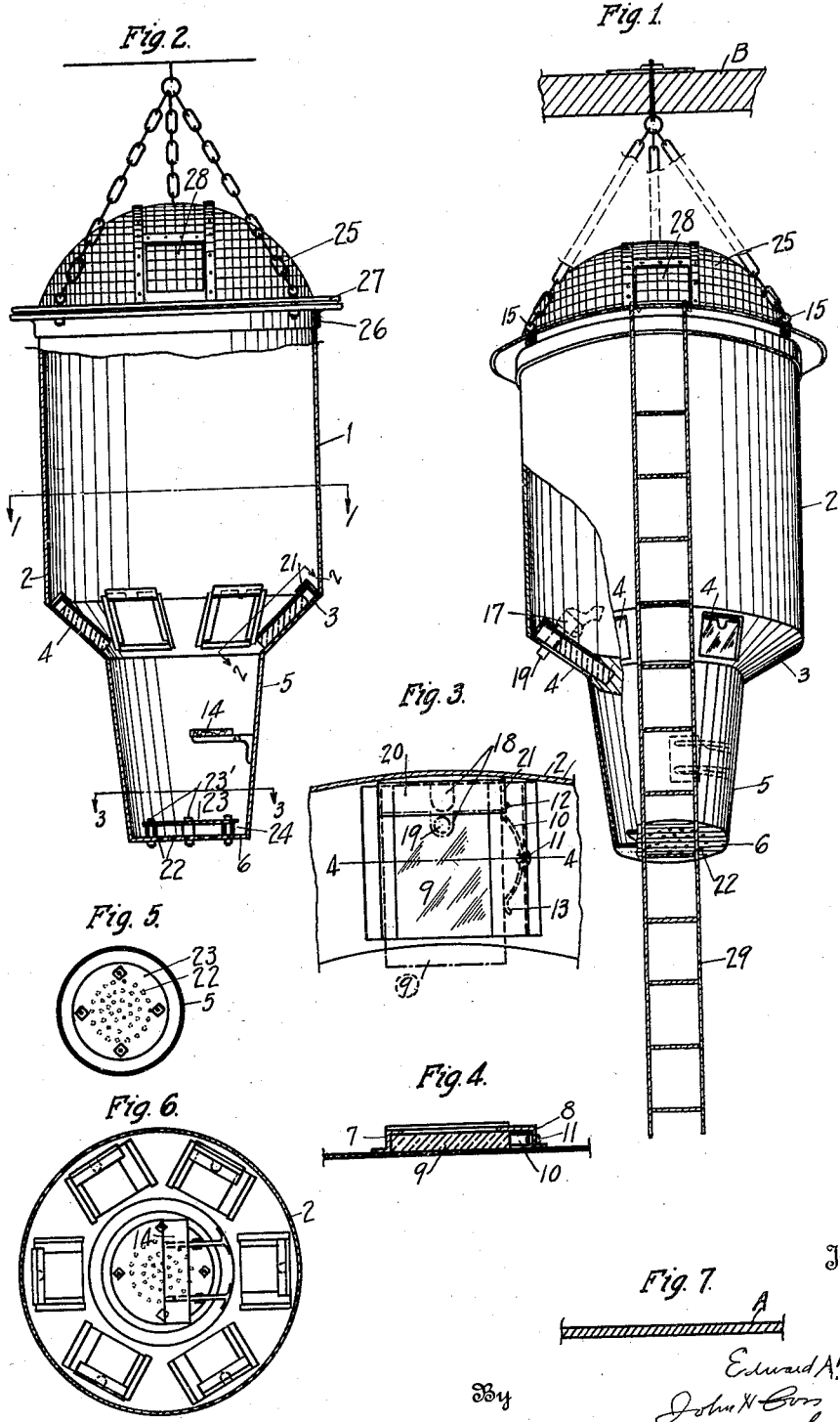
April 22, 1930.  E. A. BAKER  1,755,495
GUARD CAGE
Filed Dec. 12, 1928

1,755,495

UNITED STATES PATENT OFFICE

EDWARD A. BAKER, OF MANSFIELD, OHIO

GUARD CAGE

Application filed December 12, 1928. Serial No. 325,569.

This invention relates to improvements in a guard cage and is especially adapted to be applied to the guard cage shown and described in patent granted to Edward A. Baker, bearing date of September 11, 1928, No. 1,684,122.

One of the objects of the improvements in the invention herein referred to is to provide means for ventilating the guard cage while at the same time preventing bandits or robbers from shooting into the guard cage through the ventilating means.

Another object of the invention is to provide notches in the end of the sliding members of a size just sufficient to receive the barrel of a firearm or the like so that the only space that will be open to the interior of the guard cage will be the space defined by the notch which will be substantially closed by the barrel of the firearm when the guard is using a firearm for the purpose intended, thereby protecting the guard from being shot purposely, accidentally, or inadvertently.

Another object is to provide means for positioning the ends of the slidable members including the notches formed therein under a shield, when the guard is not required to insert the barrel of his firearm in a notch.

Other objects of the invention are to provide means for attaching a meshed member or screen to the top of the guard cage to provide for ventilation of the guard cage at the top and for preventing any missile, bomb, or the like from being thrown or projected into the guard cage at the top thereof.

These and other objects are attained by the mechanism shown in the accompanying drawing in which:

Figure 1 is a perspective view of the guard cage showing it (hanging from a support) partially broken away and a part in section.

Figure 2 is a vertical section of Figure 1 taken through center thereof, showing the ends of the slidable members positioned underneath and covered by shields.

Figure 3 shows a section of Fig. 2 taken on the line 2—2 thereof.

Figure 4 is a sectional view taken on the line 4—4 of Fig. 3.

Figure 5 is a plan view of the bottom of the cage and protector plate taken on the line 3—3 of Fig. 2.

Figure 6 is a plan view of the cage taken on the line 1—1 of Fig. 2 showing a plurality of openings formed in the cage with slidable closure members in closed positions.

Figure 7 is a sectional view of a floor or the like showing its preferred relation to the cage.

The general construction, objects and function of the guard cage are described and shown in the patent hereinbefore referred to and will not be described herein specifically, except in so far as it seems necessary to clearly show the application of the improvements, described and shown herein, to said patent.

The guard cage is preferably hung from a support, as described in said patent by any suitable means such as indicated by reference numeral 1.

The guard cage is preferably constructed of a shell 2, a flared hollow ring 3 which is provided with a plurality of openings 4 and a truncated hollow cone 5. It is closed at the bottom by a plate 6. Bracket cleats 7 and 8, preferably made Z-shape are provided and adapted to overlap slidable members 9.

Yielding springs 10 are provided and attached by rivets 11 to the bracket cleats 8 and the ends 12 and 13 thereof yieldingly contact with one side of the slidable members.

The guard's seat is indicated at 14 and supporting eyebolts of the cage at 15. A firearm is indicated at 17. Reference letter A represents the floor line and B a supporting beam or the like for the cage.

The above matter describes in general terms the construction of the guard cage which is specifically described and shown in the Letters Patent hereinbefore identified, but is not claimed herein, except in combination with other additional features or elements which accomplish new and more efficient results (as set out in the objects herein) than obtained by the construction shown in the drawing of said Letters Patent.

The new features, additional elements, their functions and application to the construction of the Letters Patent herein referred to will now be described.

The slidable members 9 are provided with a notch 18 at one end to receive the barrel 19 of the firearm 17. The notches are made of a size that will be just sufficient to permit the barrel of the firearm to move loosely within the notch 18 to any desired angular relation with respect to one of the openings 4 to permit the guard to shoot in any direction required or desired by the conditions surrounding the guard cage or the room in which it is installed.

The notches formed in the slidable members, it will be observed, permit the guard to position the slidable members 9 to cover the entire area of openings 4, except such part of the openings 4 that are exposed by the notches 18.

When the guard believes it necessary to shoot from the cage, he adjusts and positions one of the slidable members 9 to cover the opening 4 as shown in Fig. 3.

He then inserts the barrel 19 of a firearm 17 into the notch 18 and as the barrel substantially fills the space forming the notch, he can shoot from the cage and at the same time he is protected from injury, as it would be quite difficult, if not impossible, to injure him by bandits or the like shooting at the cage, as the bullets from a firearm could not enter the cage between the margin of the notch formed in the slidable member and the barrel of the firearm that the guard is using, as the barrel of the firearm substantially fills the space of the notch when the guard is shooting therefrom.

All of the openings 4 formed in the flared ring 3 are preferably closed when the guard is shooting as shown in dotted lines of Fig. 3 at 20, except the opening that the guard is shooting from.

When the guard is not shooting from the cage, he adjusts and positions all the slidable members 9 (which are preferably made of transparent material) to the positions shown in dotted line at 20 in Fig. 3. They are preferably adjusted to abut against the shell 2 with the notches thereof positioned over the margins of the openings 4 formed in the flared ring 3, thereby closing the spaces outlined by the openings 4.

To further insure the safety of the guard, shields 21 are provided. The shields are preferably constructed of angle iron having one leaf or flange thereof extending and overlapping the top of the bracket cleats 7 and 8 and the end of the slidable members 9 covering the end of the slidable members and the notches 18. (See Fig. 3.)

It will be observed that the construction of the notched slidable members and associated shields for the notched ends thereof afford maximum safety for the guard while shooting from the cage or during such time as the guard is otherwise engaged.

To provide for safety in ventilating the cage, a plurality of apertures 22 are provided in the bottom 6 of the cage which permits air to flow therethrough into the cage. An imperforate plate 23 preferably made circular in shape is provided and is mounted on the top face of the bottom of the cage in spaced apart relation to the bottom on studs 23' over the apertures 22 to protect the guard from being injured by anyone attempting to shoot into the cage through the said ventilating apertures 22.

The plate 23 is made smaller in dimension or size than the interior of the truncated cone 5 of the cage, thereby providing a space 24 surrounding the plate to permit the flow of air up and out through the top of the cage from the apertures 22. The plate 23 is preferably made of sufficient size to cover all of the apertures 22.

For preventing objects such as stones, other missiles, bombs or the like from being thrown or projected into the cage from the top of the cage and to permit the air to escape at the top for ventilation purposes, a screen top 25 preferably constructed spherical in shape, is provided and is mounted upon and attached to the top of the cage preferably by an angle iron ring 26 which is complementary to a ring 27 provided on the bottom of the screen.

The screen 25 is provided with a sliding door 28 to provide an opening to permit ingress and egress of the guard to and from the interior of the cage. A rope ladder 29 is removably attached to the top of the cage to provide means for the guard to ascend and descend to and from the opening provided by the door of the cage. It will be understood that the rope ladder is removed from the cage or stored within the cage when the guard is on duty.

Attention is called to the fact that the added features and elements in combination provide material advantages and improvements to the guard cage shown by the Letters Patent identified herein, that is, the improvements provide greater safety and ventilation for the guard and incidental benefits accruing therefrom.

I claim:

1. In a guard cage, an upper section of uniform diameter, an intermediate section secured to the upper section and inclined inwardly therefrom and also having a plurality of openings formed therein, means provided with notches at one end to close or partially close the openings, said means being slidably secured to the intermediate section, a shield secured to the intermediate section and adapted to cover the ends of the slidable means and notches in the ends thereof.

2. In a guard cage, an upper hollow section of uniform diameter, an intermediate section inclined inwardly from the upper section and secured to the upper section and also having a plurality of openings formed therein, means secured to the intermediate section to close or partially close the openings in the intermediate section, a lower tapered section provided with a bottom secured to and inclined inwardly and downwardly from the intermediate section, the bottom of the cage being provided with a plurality of apertures, a plate mounted on the bottom in spaced relation from the bottom and also leaving a space between the plate and the interior of the lower section to permit air to pass around the plate to the top of the cage.

3. In a guard cage, an upper hollow section of uniform diameter, an intermediate section inclined inwardly from the upper section and secured to the upper section and also having a plurality of openings formed therein, means secured to the intermediate section to close or partially close the openings, a lower section provided with a bottom secured to and inclined inwardly and downwardly from the intermediate section, the bottom thereof being provided with a plurality of apertures for ventilation, an imperforate plate positioned in spaced relation over the apertures in the bottom and also leaving a space between the plate and the interior of the lower section to permit air to pass under and around the plate to the top of the cage and a screen attached to the top of the hollow section.

4. In a guard cage, comprising a circular, a tapered, and an intervening member provided with openings all associated together, the lower tapered member being provided with a closure member having a plurality of apertures therein, an imperforate member fitted within the bottom of the tapered member adjacent to the apertures in the closure member and smaller than the interior of the tapered member to provide a space therebetween and slidable members adapted to slide over the openings in the intervening member.

5. In a guard cage, comprising a circular, a tapered, and an intervening member provided with openings all associated together, the tapered member at its bottom being provided with a closure member having a plurality of apertures therein, an imperforate member fitted within the tapered member adjacent to the apertures in the bottom of the tapered member and smaller than the interior of the tapered member to provide a space therebetween, slidable members adapted to slide over the openings in the intervening member and bracket members arranged around the intervening member and provided with flanges which extend over the body portion thereof to cover notches formed in the slidable members.

6. In a guard cage, in combination, comprising circular, a tapered, and an intervening member provided with openings all associated together, the tapered member being provided with a closure bottom member having a plurality of apertures formed therein, an imperforate member fitted within the tapered member adjacent to the apertures in the bottom of the tapered member to provide a space therebetween, slidable members adapted to slide over the openings in the intervening member of the guard cage and bracket members arranged around the intervening member and provided with flanges extending over the body portions thereof and adapted to cover the notches provided in the slidable members.

7. In a guard cage, comprising a circular, a tapered and an intervening member provided with openings all associated together, the tapered member being provided with a closure member at the bottom having a series of apertures formed therein, an imperforate member fitted within the tapered member adjacent to the apertures in the closure member and which is smaller than the interior of the bottom of the tapered member to provide a space therebetween, slidable members adapted to slide over the openings in the intervening member, bracket members arranged around the intervening member and provided with flanges extending over the body portion thereof, the flanges being adapted to cover notches formed in the slidable members and ventilating means to cover the top of the guard cage for protection and to provide means of ingress and egress, therefrom.

In testimony whereof I affix my signature.

EDWARD A. BAKER.